US009026243B2

(12) United States Patent
Radwallner et al.

(10) Patent No.: US 9,026,243 B2
(45) Date of Patent: May 5, 2015

(54) ORDER-PICKING STATION, AND METHOD FOR THE ORDER-PICKING OF ARTICLES FROM LOADING AIDS

(75) Inventors: Guenther Radwallner, Voecklabruck (AT); Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 14/342,604

(22) PCT Filed: Sep. 5, 2012

(86) PCT No.: PCT/AT2012/050126
§ 371 (c)(1),
(2), (4) Date: Mar. 4, 2014

(87) PCT Pub. No.: WO2013/033743
PCT Pub. Date: Mar. 14, 2013

(65) Prior Publication Data
US 2014/0249666 A1 Sep. 4, 2014

(30) Foreign Application Priority Data
Sep. 5, 2011 (AT) .................................... 1261/2011

(51) Int. Cl.
G06F 7/00 (2006.01)
B65G 1/137 (2006.01)

(52) U.S. Cl.
CPC .............. *B65G 1/137* (2013.01); *B65G 1/1378* (2013.01)

(58) Field of Classification Search
CPC ............. A61B 19/026; A61B 19/0287; A61B 2019/021; A61B 2019/0212
See application file for complete search history.

(56) References Cited

U.S. PATENT DOCUMENTS 4,909,697 A    3/1990   Bernard, II et al.
(Continued)

FOREIGN PATENT DOCUMENTS

DE     103 07 949 A1     9/2004
DE     10 2005 045 971 A1     4/2007
DE     20 2010 005 244 U1    11/2010
EP     0 430 176 A1     6/1991
(Continued)

OTHER PUBLICATIONS

International Search Report of PCT/AT2012/050126, mailed Dec. 19, 2012.

*Primary Examiner* — Yolanda Cumbess
(74) *Attorney, Agent, or Firm* — Collard & Roe, P.C.

(57) ABSTRACT

The invention relates to an order picking station (48) and a method of picking articles from loading aids (2) by an order picker, adjoined by automated conveyor systems (20, 41) disposed on different height levels, loading aids (2) being conveyed to the order picking station (48) on a first conveyor system (20) and loading aids (2) being conveyed away from the order picking station (48) by a second conveyor system (41), and comprising a loading aid supply apparatus (61), an automated first loading aid transport apparatus for transporting loading aids (2) to the loading aid supply apparatus (61) and an automated second loading aid transport apparatus for transporting loading aids (2) away from the loading aid supply apparatus (61), and the first loading aid transport apparatus has a first carrying unit (62) for a loading aid (2) and the second loading aid transport apparatus has a second carrying unit (63) for a loading aid (2). The first carrying unit (62) and second carrying unit (63) are coupled by a common, reversible positioning drive (65). The invention further relates to an order picking system and a storage system with such an order picking station (48).

25 Claims, 8 Drawing Sheets

(56) References Cited

U.S. PATENT DOCUMENTS

| | | | |
|---|---|---|---|
| 5,096,366 A * | 3/1992 | Bernard et al. | 414/800 |
| 5,156,514 A | 10/1992 | Zaeh | |
| 5,211,702 A | 5/1993 | Tanaka | |
| 5,222,855 A | 6/1993 | Bernard, II et al. | |
| 5,246,332 A | 9/1993 | Bernard, II et al. | |
| 5,601,395 A * | 2/1997 | Lichti et al. | 414/807 |
| 7,397,278 B2 | 7/2008 | Nakao | |
| 7,766,151 B2 | 8/2010 | Schaefer | |
| 2004/0253082 A1 | 12/2004 | Mathys et al. | |
| 2012/0101627 A1 * | 4/2012 | Lert | 700/216 |

FOREIGN PATENT DOCUMENTS

| | | |
|---|---|---|
| EP | 0 594 254 A1 | 4/1994 |
| EP | 1 010 647 A1 | 6/2000 |
| EP | 1 443 002 A1 | 8/2004 |
| EP | 1 572 558 A1 | 9/2005 |
| EP | 2 050 695 A1 | 4/2009 |
| EP | 2 098 464 A1 | 9/2009 |
| JP | 4116001 B2 | 7/2008 |
| WO | 03/024845 A1 | 3/2003 |
| WO | 2011/103404 A1 | 8/2011 |

* cited by examiner

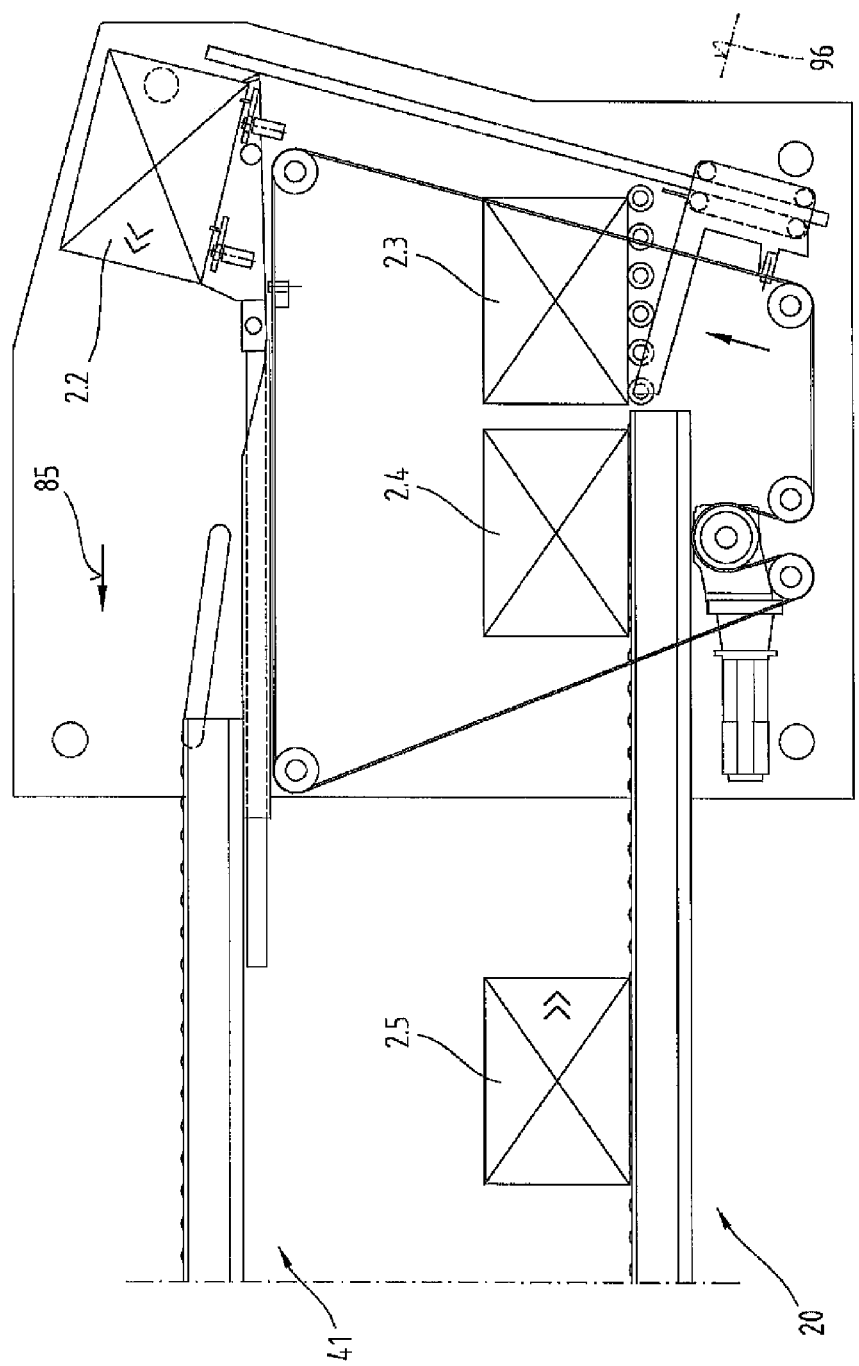

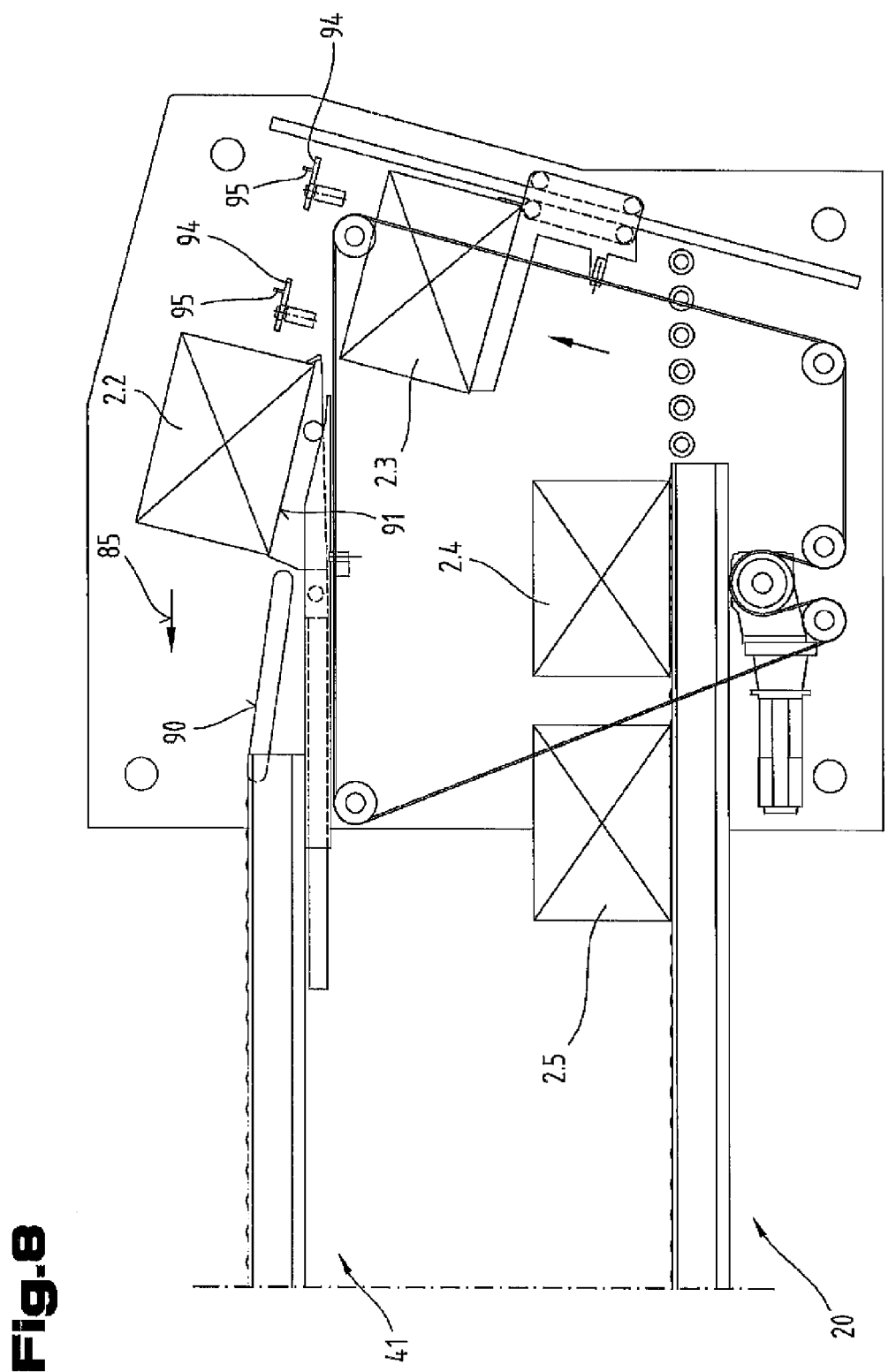

ORDER-PICKING STATION, AND METHOD FOR THE ORDER-PICKING OF ARTICLES FROM LOADING AIDS

CROSS REFERENCE TO RELATED APPLICATIONS

This application is the National Stage of PCT/AT2012/050126 filed on Sep. 5, 2012, which claims priority under 35 U.S.C. §119 of Austrian Application No. A 1261/2011 filed on Sep. 5, 2011, the disclosure of which is incorporated by reference. The international application under PCT article 21(2) was not published in English.

The invention relates to an order picking station and a method by which an order picker can pick articles from loading aids, such as containers, boxes, trays, etc., adjoining automated conveyor systems disposed on different levels, loading aids being conveyed to the order picking station on a first conveyor system and loading aids being conveyed away from the order picking station on a second conveyor system, comprising a loading aid supply apparatus, an automated first loading aid transport apparatus for transporting loading aids to the loading aid supply apparatus and an automated second loading aid transport apparatus for transporting loading aids away from the loading aid supply apparatus, and the first loading aid transport apparatus has a first carrying unit for a loading aid which is displaceable essentially in the vertical direction and the second loading aid transport apparatus has a second carrying unit for a loading aid which is displaceable essentially in the horizontal direction.

In recent times, there has been a move towards order picking based on the "goods to man" principle. Based on the goods to man principle, the order picker is assigned a fixed work station and moves away from it as little and as seldom as possible. The articles to be picked are transported to the order picker. This increases the efficiency of an order picking system and satisfies the high ergonomic demands which are becoming an increasing focus of attention.

The term "articles" should be understood as meaning articles which can be stored in an article warehouse. Such articles might be medicaments, tool parts or similar, for example, which can be ordered by customers in any number and any mix. These ordered articles are then assembled to make up a single order, and the articles are then picked and placed in a destination container and the picked articles delivered to the customer.

By destination container is meant a container in which the articles to be picked are placed. A destination container may hold a plurality of different articles up until the picking order assigned to it is complete, i.e. until all the articles belonging to the picking order have been retrieved from the racking bays and transported to the work station, where they are placed in the corresponding destination container by the order picker.

Such order picking methods are known from the order picking systems disclosed in DE 103 07 949 A1, DE 10 2005 045 971 A1, EP 1 572 558 A1 and U.S. Pat. No. 5,246,332.

EP 2 098 464 A1 discloses an order picking system whereby articles are picked from source containers and placed in destination containers by an order picker, with an order picking station for source containers and several order picking stations for destination containers, which order picking stations have destination container circulating conveyor systems, each of which is configured to enable several destination containers to be circulated by it repeatedly along a destination container conveyor circuit to the order pickers until the respective destination container corresponding to a picking order has been filled with articles from one or more source containers. Due to the fact that destination containers have to be repeatedly supplied to the respective circulating conveyor system, not only are correspondingly powerful drives necessary, energy consumption is also high. Furthermore, it is not possible to uncouple the container movements at an order picking station along the transport route for the containers because the order picking station does not have a supply apparatus separate from the circulating conveyor system.

A generic order picking station for source containers is also known from EP 2 050 695 A1, which comprises an automated first source container transport apparatus for transporting source containers to a supply apparatus and an automated second source container transport apparatus for transporting source containers away from the supply apparatus, and the first source container transport apparatus has a first carrying unit for a source container and the second source container transport apparatus has a second carrying unit for a source container. The transport apparatuses each have a drive station, and the drives of the drive stations have to be controlled very precisely by a control unit. This increases the complexity of the control system and the fact that a minimum number of two drives is needed pushes up the cost of producing the order picking station. Energy consumption is also high.

DE 20 2010 005 244 U1 discloses an order picking station for picking articles from loading aids, which comprises a vertically displaceable loading aid transport apparatus (forklift) for transporting loading aids to a picking position and a second loading aid transport apparatus (dual belt conveyor) mounted thereon for conveying loading aids away from the picking position.

An order picking station for picking articles from loading aids is also known from WO 2011/103404 A1 and comprises an automated first loading aid transport apparatus (elevator assembly) for conveying loading aids to a picking position and an automated second loading aid transport apparatus (extractor assembly) for conveying loading aids away from the picking position. The first loading aid transport apparatus has a first carrying unit for a loading aid displaceable essentially in the vertical direction and the second loading aid transport apparatus has a second carrying unit for a loading aid displaceable essentially in the horizontal direction. Based on a first embodiment, a positioning drive with two drive stations is provided, by means of which the displacing movements of the first carrying unit and second carrying unit can be uncoupled from one another. Accordingly, the second carrying unit can be moved back out of the picking position of the loading aid by the second drive station already, whilst the first carrying unit is not yet being driven by the first drive station and is still in a transfer position for the loading aid. Based on a second embodiment, the positioning drive alternatingly drives two mutually independent traction drives via a common drive station and thereby enables the carrying units to be displaced by movements that are offset in time (uncoupled in time). A gear system with complex gear components between an electric motor and two drive shafts are needed to achieve this. The first drive shaft is coupled with the first traction drive for the first carrying unit and the second drive shaft is coupled with the second traction drive for the second carrying unit. Such a gear system requires regular maintenance and generates a relatively loud noise during operation, which may be perceived as unpleasant by an order picker.

The underlying objective of this invention is to propose an order picking station and a method for picking articles from source loading aids which is compact in terms of design and which is distinctive due to its efficient operation. The order picking station should offer advantages when used in an order picking system and the order picking system should offer advantages when used in a storage system.

The objective of the invention is achieved due to the fact that the first carrying unit and second carrying unit are coupled by a common, reversible positioning drive, and the positioning drive has at least one traction drive and both the first carrying unit and second carrying unit are connected to the at least one traction drive and are coupled in displacement via the same at least one traction drive. The carrying units preferably each have a guide frame and, connected thereto, a carrying platform for a loading aid. The guide frame of the first carrying unit is fixedly connected by means of at least one fixing means to the traction drive in a first longitudinal portion and the guide frame of the second carrying unit is fixedly connected by means of at least one fixing means to the traction drive in a second longitudinal portion. Accordingly, the carrying units are held at a fixed distance relative to the traction drive or traction means, which remains unchanged whilst the carrying units are being displaced.

The order picking station is suitable for implementing the method defined in one of claims 21 to 24.

The objective of the invention is also achieved due to the fact that the first carrying unit and second carrying unit are moved by at least one traction drive of a common positioning drive simultaneously and jointly in a shuttling motion in opposite directions of movement respectively along a transport path between the conveyor systems so that a first loading aid is conveyed between one of the conveyor systems and one of the carrying units and a second loading aid is held in readiness at the supply apparatus by the other one of the carrying units. Consequently, the two carrying units are moved simultaneously and in the same direction either in the first direction of movement respectively into their pick-up and transfer positions or in the second direction of movement respectively into their transfer and pick-up positions. As this happens, the carrying units are simultaneously accelerated out of their pick-up and transfer positions and simultaneously decelerated into the transfer and pick-up positions.

It is of advantage if the first carrying unit for conveying a first loading aid can be moved in a shuttling motion between the first conveyor system and the supply apparatus and the second carrying unit for conveying a second loading aid can be conveyed in a shuttling motion between the supply apparatus and the second conveyor system. Accordingly, the direction of the displacing movement for the first carrying unit and second carrying unit is reversed synchronously when a first loading aid has reached a pick-up and transfer position at the first conveyor system and a second loading aid has reached a transfer and pick-up position at the second conveyor system.

It is of advantage if the positioning drive comprises a drive station with a reversible drive motor, in particular a reversible electric motor, and at least one traction drive. This results in a very compact design of the positioning drive.

If the positioning drive comprises a drive station and synchronously drivable traction drives on either side of a transport path for the loading aids extending between the conveyor systems, the conveying movement for the loading aids between the transport apparatuses is unobstructed.

The drive station comprises a single reversible drive motor, in particular a reversible electric motor, which can be operated between the reversing positions for the carrying units in an optimum manner terms of low noise during order picking as well as conveying movement, acceleration values and conveying speeds of the loading aids.

It is of advantage if the first carrying unit for a loading aid is coupled with the positioning drive, in particular with the traction drive or drives, in such a way that the carrying unit can be moved between a pick-up and transfer position at the first conveyor system and a transfer and pick-up position at the supply apparatus. The first carrying unit can be moved backwards and forwards in a shuttling motion between the reversing positions for the carrying unit at the first conveyor system defining the transfer and pick-up positions and the supply apparatus.

The first carrying unit for a loading aid can be supported via at least one guide element mounted thereon on a fixed (stationary) guide arrangement. This enables the weight bearing on the first carrying unit to be transferred to the stationary guide arrangement and optionally frame parts of the order picking station.

A particularly compact design of the order picking station is obtained if the first carrying unit comprises a guide frame incorporating the guide elements and a carrying platform for a loading aid extending out from it, and the guide frame is connected to the positioning drive, in particular to the traction drive or drives.

It is of advantage if the second carrying unit for a loading aid is coupled with the positioning drive, in particular the traction drive or drives, in such a way that the carrying unit can be moved between a pick-up or transfer position at the supply apparatus and a transfer or pickup position at the second conveyor system. The second carrying unit can be moved backwards and forwards in a shuttling motion between the reversing positions for the carrying unit at the second conveyor system defining the transfer and pick-up positions and the supply apparatus. Accordingly, the first carrying unit and second carrying unit are coupled with the positioning drive at a mutual (fixed) distance in the direction of the transport path. In this respect, the distance preferably corresponds to at least twice the loading aid longitudinal dimension, thereby preventing any collision between the carrying units during a displacing movement and loading aids during a conveying movement along the transport path.

The second carrying unit for a loading aid can be supported via at least one guide element mounted thereon on a fixed (stationary) guide arrangement. This enables the weight bearing on the second carrying unit to be transferred to the stationary guide arrangement and optionally frame parts of the order picking station.

A particularly compact design of the order picking station is obtained if the second carrying unit comprises a guide frame incorporating the at least one guide element and a carrying platform for a loading aid mounted thereon, and the guide frame is connected to the positioning drive, in particular to the traction drive or drives.

A very quiet transfer or pick-up of a loading aid between the second carrying unit and the second conveyor system is achieved if the guide arrangement extends in the direction of a transport path between the loading aid supply apparatus and the second conveyor system, and the guide arrangement has a guide portion which forms an inclined miming plane for the guide element of the second carrying unit.

If the carrying platform has a carrying surface for at least one loading aid and a retaining element projecting out from the carrying surface, the loading aid can be supported against the retaining element during the horizontal movement of the second carrying unit so that the loading aid can be subjected to high acceleration values. This enables the time needed to switch a loading aid between the conveyor systems to be significantly reduced, thereby increasing the throughput rate at the order picking station.

The carrying platform of the first carrying unit and/or the second carrying unit may also have a carrying surface that is inclined downwards at an angle relative to a horizontal plane and in the direction of the supply apparatus, which makes it easier to place the loading aid in contact with the retaining element and to see the contents of a loading aid to be conveyed to the supply apparatus. This enables an order picker to get ready for the picking operation very quickly and results in very ergonomic order picking.

It is also of advantage if the second conveyor system comprises a transfer device in a first conveyor portion and a conveyor device in a second conveyor portion, in which case the transfer device links the conveyor device and the second carrying unit so that a loading aid can be conveyed between the second conveyor system and second carrying unit. This enables the displacing movement of the second carrying unit to be uncoupled from the displacing movement of the second conveyor system so that the second carrying unit can already be moved back out of the transfer or pick-up position at the second conveyor system into the transfer or pick-up position at the supply apparatus as soon as the loading aid is bearing on the second conveyor system by a point just beyond its vertical center of gravity. The conveying speed of the loading aids on the second conveyor system can also be selected so that it is higher than the conveying speed of the loading aid on the second carrying unit. This enables the switching time for moving a loading aid between conveyor systems to be reduced even further, thereby increasing the throughput rate at the order picking station.

A particularly compact design of the order picking station is also obtained if the loading aid supply apparatus is disposed in a stationary arrangement in the transport path between the first conveyor system and second conveyor system and has at least one parking element on either side of the transport path for a loading aid each, which parking elements can be moved by at least one actuator drive between an initial position in which a loading aid can be moved between the parking elements and a pick-up position in which a loading aid can be supplied to the loading aid supply apparatus on the parking elements.

The objective of the invention is also achieved by the features defined in claim 15. The compactly designed order picking station can be very easily integrated in an order picking system and operated very economically because the switching time for moving a loading aid between conveyor systems is low.

If the order picking stations are installed adjacent to one another in a row and an order picking station for destination loading aids is disposed between order picking stations for source loading aids, an order picker can be continuously supplied with articles virtually without interruption. This enables the throughput rate at the order picking system to be increased.

If the order picking stations are then each adjoined by a first conveyor system conveying loading aids to the order picking station on a first circulating conveyor, the order picking stations can be continuously supplied with loading aids virtually without interruption. This enables the throughput rate of the order picking system to be increased.

If, in addition, the order picking stations are each adjoined by a second conveyor system conveying loading aids away from the order picking station on a second circulating conveyor, partially or totally emptied source loading aids or "fully picked" or "partially picked" destination loading aids can be very rapidly conveyed away from the order picking stations again. This enables the throughput rate of the order picking system to be increased.

The objective of the invention is also achieved by the features defined in claim 19. The compactly designed order picking stations can be very easily integrated in an order picking system within a storage system. The storage system can be operated very economically because the throughput rate of the order picking system is very high. The first distribution system can be used for supplying both source loading aids and destination loading aids.

Also of advantage is the fact that the automated second distribution system conveys source loading aids to a storage return conveyor system and/or destination loading aids for picking orders between the order picking workstations, where the order picking stations of the order picking workstations are connected by the second conveyor system conveying source and/or destination loading aids away from the order picking stations. The second distribution system can be used for conveying both source loading aids and destination loading aids.

It is of advantage if, during a first movement cycle for transporting a first loading aid away from the supply apparatus and for transporting a second loading aid to the supply apparatus, the carrying units, coupled in displacement, are moved in a first direction of movement to transfer positions (the loading aids are transported from the bottom to the top) or pick-up positions (the loading aids are transported from the top to the bottom) at the conveyor system and supply apparatus.

When the loading aids are being transported from the bottom to the top, it is of advantage if, after transferring the first loading aid from the second carrying unit onto the (upper) conveyor system and the second loading aid from the first carrying unit to the supply apparatus, the carrying units, coupled in displacement, are moved back into the pick-up positions at the (lower) conveyor system and supply apparatus opposite the first direction of movement during a subsequent second movement cycle.

When the loading aids are being transported from the top to the bottom, it is of advantage if, after transferring the first loading aid from one carrying unit onto the supply apparatus and the second loading aid from the other carrying unit onto the conveyor system, the carrying units, coupled in displacement, are moved back into the pick-up positions at the conveyor system and supply apparatus opposite the first direction of movement in a subsequent movement cycle.

To provide a clearer understanding, the invention will be described in more detail below with reference to the appended drawings.

These are very schematically simplified diagrams illustrating the following:

FIGS. 4 to 8 is a sequence diagram showing the conveying movement of loading aids, for example containers, between a first conveyor system and a second conveyor system.

Figure 1:
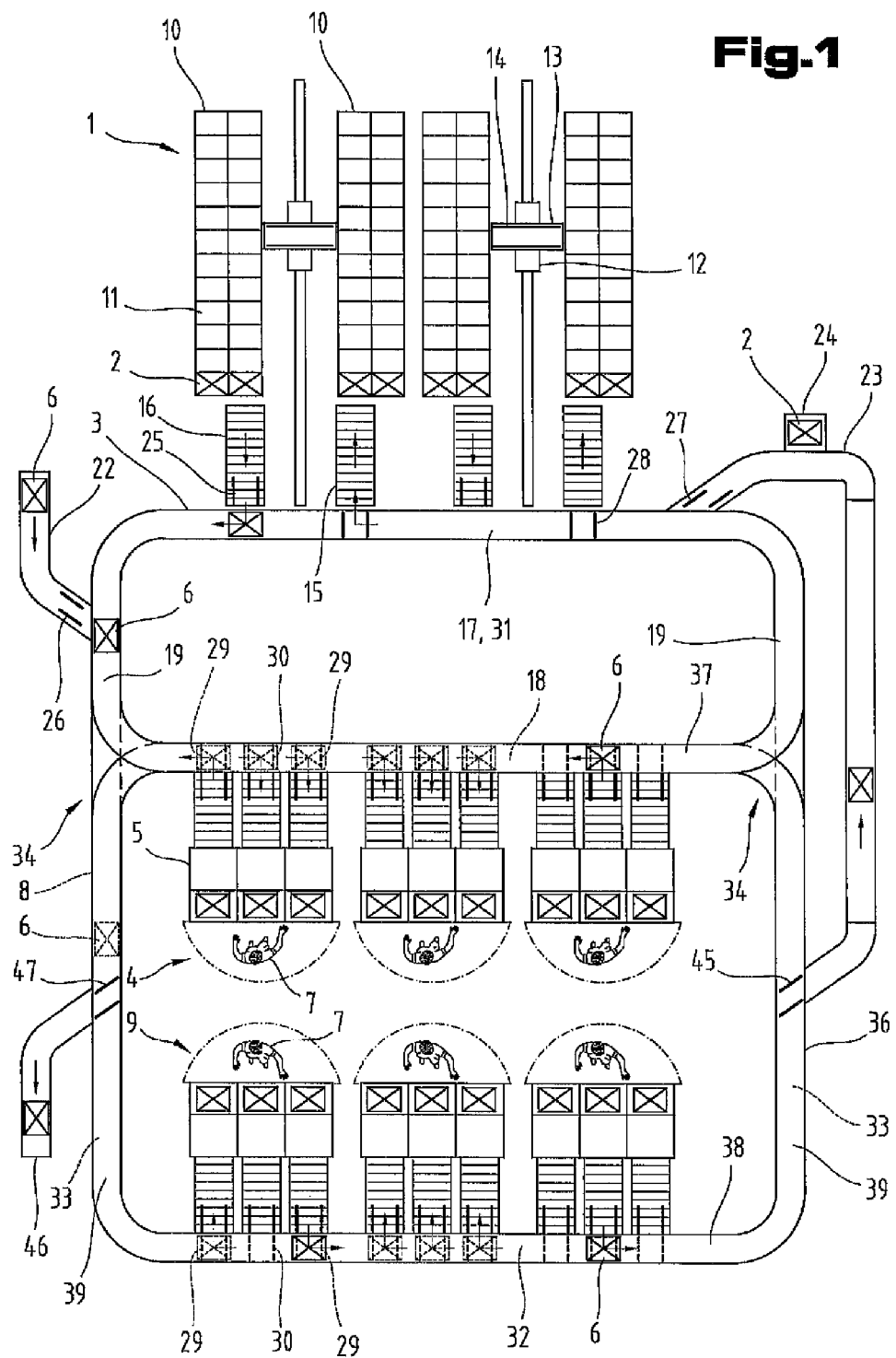
FIG. 1 is a plan view illustrating a storage system with order picking workstations.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Hereafter, the invention will be described in connection with containers. The term "container" should not be seen as restrictive and is merely one example of a plurality of possible loading aids, such as, for example, trays, pallets, boxes, etc., which can be used as a means of storing and transporting articles and objects for order picking.

The storage system illustrated in FIG. 1 comprises high-bay racking 1 (article store), an automated conveyor system for storing source containers 2 in the high-bay racking 1 or retrieving source containers 2 from the high-bay racking 1, an automated first distribution system 3, a plurality of order picking workstations 4 each with an order picking system 5 whereby articles can be picked from at least one source container 2 and placed in at least one destination container 6 by an order picker 7. The number of order picking workstations 4 may vary depending on the range of articles and/or the throughput rate.

If a particularly high throughput rate or picking efficiency is needed, the storage system may also have an automated second distribution system 8 and a plurality of order picking workstations 9 each with an order picking system 5 whereby articles can be picked from at least one source container 2 and placed in at least one destination container 6 by an order picker 7. The order picking workstations 9 are preferably identical to the order picking workstations 4.

The high-bay racking 1 has racking bays 10 disposed in parallel, in which the source containers 2 are stored in single-depth or, as illustrated, double-depth storage spaces 11 disposed one above the other at different shelf levels. Disposed between the racking bays 10 in each case is a bay aisle in which at least one computer-controlled stacker vehicle 12 can be displaced on rails. In the embodiment illustrated, the stacker vehicle 12 is equipped with a vertical mast, a platform 13 mounted on the vertical mast so that it can be raised and lowered and with a schematically indicated load-carrying device 14 by means of which the source containers 2 can be stored and retrieved. Every stacker vehicle 12 services two oppositely lying racking bays 10.

Based on another embodiment (not illustrated), the high-bay racking 1 may have guide rails affixed respectively to the racking bays 10 at the shelf levels and extending along the bay aisle, and autonomous single-level shelf-servicing devices (shuttles) in at least some of the shelf levels which can be displaced on the guide rails in order to transport the source containers 2 to the storage spaces, and the single-level shelf-servicing device is equipped with the load-carrying device 14 by means of which the source containers 2 can be stored and retrieved.

At its terminal end, the bay aisle is provided with a goods-in conveyor 15 and a goods-out conveyor 16, which run in the extension of the racking bays 10. On the goods-in conveyor 15, for example a roller conveyor, belt conveyor and such like, source containers 2 are brought in and then transferred to the stacker vehicle 12. The movement transferring a source container 2 between the goods-in conveyor 15 and the platform 13 may be handled automatically by the load-carrying device 14 or by a loading device (not illustrated) separate from the stacker vehicle 12, for example a pusher.

On the goods-out conveyor 1, for example a roller conveyor, belt conveyor and such like, source containers 2 that were previously transferred by the stacker vehicle 12 to the goods-out conveyor 16 are dispatched. The movement transferring a source container 2 between the platform 13 and the goods-out conveyor 16 may be handled automatically by the load-carrying device 14 or by a loading device (not illustrated) separate from the stacker vehicle 12, for example a pusher.

The automated conveyor system for bringing source containers 2 into the high-bay racking 1 or retrieving source containers 2 from the high-bay racking 1 therefore comprises, for each bay aisle, at least one stacker vehicle 12, the goods-in conveyor 15 and the goods-out conveyor 16. The high-bay racking 1 may comprise one or more bay aisles.

The order picking workstations 4 are connected via the automated first distribution system 3 to the high-bay racking 1. The first distribution system 3 comprises a circulating conveyor with straight conveyor sections 17, 18 extending perpendicular to the bay aisles and conveying in opposite directions and conveyor sections 19 linking the latter at the end. The circulating conveyor is provided in the form of a roller conveyor, belt conveyor, chain conveyor and similar, for example.

The goods-in and goods-out conveyors 15, 16 adjoin the first conveyor portion 17 of the distribution systems 3. The order picking workstations 4 incorporating the respective order picking system 5 are connected to the distribution system 3, in particular the second conveyor portion 18, via a first conveyor system 20 (FIG. 2) for source containers 2 and a first conveyor system 21 (FIG. 2) for destination containers 6.

As schematically indicated in FIG. 1, an automated storage supply conveyor 22 may likewise be connected to the distribution system 3, by means of which empty destination containers 6 can be dispatched from the store and conveyed to the distribution system 3. The first distribution system 3 may also connect with an automated storage return conveyor 23, by means of which source containers 2 which still contain articles after a picking operation can be conveyed to the first distribution system 3 and from there back into the high-bay racking 2. Emptied source containers 2 from which all the articles have been removed after at least one picking operation are conveyed by means of the storage return conveyor 23 to an assembly station 24. Empty source containers 2 may also be used as destination containers 6, in which case they are conveyed to the storage supply conveyor 22.

A situation is also possible in which a destination container 6 for a picking order has to be filled with different articles at several order picking systems 5 and conveyed from the first order picking system 5 where "first part-order picking" takes place via the first distribution system 3 and optionally the second distribution system 8 and directed to the second order picking system 5 where "second part-order picking" takes place. To this end, the "partly picked" destination container 6 is conveyed by a third distribution system 36, which will be described in more detail below, via the storage return conveyor 23 to the first distribution system 3 and then optionally to the second distribution system 8.

The source containers 2 needed from the high-bay racking 1 for a picking order may be automatically transferred via an infeed diverter device 25 between the goods-out conveyor 16 and the distribution system 3. The infeed diverter device 25 is provided in the form of a strap offset, for example, which is integrated at the terminal end of the goods-out conveyor 16. Alternatively, the infeed diverter device 25 may also be provided in the form of a ram which can be operated by means of an actuator drive.

The empty destination containers 6 needed for a new picking order can be automatically transferred between the storage supply conveyor 22 and the distribution system 3 by means of an infeed diverter device 26. The infeed diverter device 26 is provided in the form of a strap offset, for example, which is integrated in the storage supply conveyor 22 at one end.

Source containers 2 which are no longer needed at one of the order picking workstations 4; 9 after a picking operation and still contain articles can be automatically transferred between the storage return conveyor 23 and the distribution system 3 by means of an infeed diverter device 27. The infeed diverter device 27 is provided in the form of a strap offset, for example, which is integrated in the storage return conveyor 23 at one end.

Still partially filled source containers 2 are automatically transferred by means of an outfeed diverter device 28 between the distribution system 3 and a goods-in conveyor 15. The outfeed diverter device 28 is provided in the form of a strap offset, for example, which is integrated in the conveyor portion 17 adjacent to the high-bay racking 1. Alternatively, the outfeed diverter device 28 may also be provided in the form of a pusher which can be operated by means of an actuator drive.

Source containers 2 needed for a picking order and conveyed on the first distribution system 3 to the respective order picking workstation 4 or the respective order picking station 5 are automatically transferred by means of an outfeed diverter device 29 between the first distribution system 3 and the first conveyor system 20 for source containers 2.

Empty destination containers 6 needed for a picking order and conveyed on the first distribution system 3 to the respective order picking workstation 4 or the respective order picking station 5 are automatically transferred by means of an outfeed diverter device 30 between the first distribution system 3 and the first conveyor system 21 for destination containers 6.

As described above, the storage system may also have a second distribution system 8, to which the order picking workstations 9 are connected and which connects the order picking workstations 9 to the high-bay racking 1. The second distribution system 8 comprises a circulating conveyor with straight conveyor sections 31, 32 extending perpendicular to the bay aisles conveying in opposite directions, and conveyor sections 33 connecting the latter at the end. The circulating conveyor is provided in the form of a roller conveyor, belt conveyor, chain conveyor and similar, for example.

The straight conveyor portions 17, 31 of distribution systems 3, 8 therefore form a single conveyor portion. The conveyor portions 33 of the second distribution system 8 extend in the extension of the conveyor portions 19 of the first distribution system 3. Accordingly, source containers 2 and order containers 6 can be directed either to the circulating conveyor of distribution system 3 or to the circulating conveyor of distribution system 8 by means of automated, controllable conveying diverters 34 disposed in the crossover areas of the distribution systems 3, 8.

The order picking workstations 9 with the respective order picking system 5 are in turn connected via a first conveyor system 20 (FIG. 2) for source containers 2 and a first conveyor system 21 (FIG. 2) for destination containers 6 to the second conveyor portion 32.

Source containers 2 needed for a picking order and conveyed on the second distribution system 8 to the respective order picking workstation 9 or the respective order picking station 5 are automatically transferred by means of an outfeed diverter device 29 between the second distribution system 8 and the first conveyor system 20 for source containers 2.

Destination containers 6 needed for a picking order and conveyed on the second distribution system 8 to the respective order picking workstation 9 or the respective order picking station 5 are automatically transferred by means of an outfeed diverter device 30 between the second distribution system 8 and the first conveyor system 21 for destination containers 6.

The outfeed diverter devices 29, 30 used to distribute the source and destination containers 2, 6 to the respective order picking workstations 4; 9 and order picking station 5 are provided in the form of a strap offset, for example, integrated in the conveyor portion 18, 32 remote from the high-bay racking 1. Alternatively, the outfeed diverter device 29, 30 may also be provided in the form of a pusher lying opposite the first conveyor systems 20, 21, which can be operated by means of an actuator drive.

The first distribution system 3 forms a first (bottom) conveyor level 35 (FIG. 2) on which the source and/or destination containers 2, 6 can be transported to one or more order picking stations 5, as indicated by the arrows. Similarly, the second distribution system 8, if one is provided, forms a first (bottom) conveyor level 35 (FIG. 2) on which the source and/or destination containers 2, 6 can be transported in the conveying direction indicated by the arrows to one or more order picking stations 5.

The storage system illustrated in FIG. 1 further comprises an automated third distribution system 36, which is preferably disposed above the first distribution system 3 and a circulating conveyor with straight conveyor sections 37, 38 extending perpendicular to the bay aisles and conveying in opposite directions, and conveyor sections 39 linking the latter at the end. The circulating conveyor is provided in the form of a roller conveyor, belt conveyor, chain conveyor and similar, for example.

The third distribution system 36 forms a second (top) conveyor level 40 (FIG. 2) on which the source and/or destination containers 2, 6 can be transported away from one or more order picking stations 5 in the conveying direction indicated by the arrows, preferably to the high-bay racking 1.

The order picking workstations 4 with the respective order picking system 5 are connected via a second conveyor system 41 (FIG. 2) for source containers 2 and via a second conveyor system 42 (FIG. 2) for destination containers 6 to the distribution system 36, in particular the first conveyor portion 37.

Source containers 2 to be transported away from the order picking station 5 after a picking operation (partially or completely empty) can be automatically transferred by means of an infeed diverter device 43 between the second conveyor system 41 and the distribution system 36.

Destination containers 6 to be transported away from the order picking station 5 after a picking operation can be automatically transferred by means of an infeed diverter device 44 between the second conveyor system 42 and the distribution system 36.

The infeed diverter devices 43, 44 may be provided in the form of a strap offset, for example, which is integrated in the second conveyor system 41, 42 at the end.

Connected to the third distribution system 36 is the automated storage return conveyor 23, which is in turn connected to the first distribution system 3 so that partially emptied source containers 2 can be conveyed from the respective order picking station 5 back to the first distribution system 3 and from it into the high-bay racking 1 on the one hand, and completely emptied source containers 2 can be conveyed from the respective order picking station 5 back to the assembly station 24 on the other hand. In order to bridge the difference in level between the first and third distribution systems 3, 36, the storage return conveyor 23 has an inclined conveyor portion. Alternatively, the storage return conveyor 23 may also be provided in the form of a vertical lift connecting the first (bottom) conveyor level 35 and second (top) conveyor level 40 and distribution systems 3, 36 to one another.

Accordingly, the source containers 2 are automatically transferred by means of an outfeed diverter device 45 between the third distribution system 36 and the storage return conveyor 23.

Also connected to the third distribution system 36 is an automated conveyor 46, in particular a buffer conveyor, which conveys destination containers 6 filled for completed picking orders away. The conveyor 46 may lead to a consolidation storage (not illustrated) or a goods-out area (not illustrated).

The destination containers 6 are automatically transferred by means of an outfeed diverter device 47 between the third distribution system 36 and the conveyor 46.

The outfeed diverter device 45, 47 is provided in the form of a strap offset, for example, integrated in the conveyor portion 39.

The order picking workstations 9 with the respective order picking system 5 are in turn connected in the same manner as the order picking workstations 4 via the second conveyor system 41 (FIG. 2) for source containers 2 and the second conveyor system 42 (FIG. 2) for destination containers 6 to the third distribution system 36, in particular the second conveyor portion 32.

Figure 2:
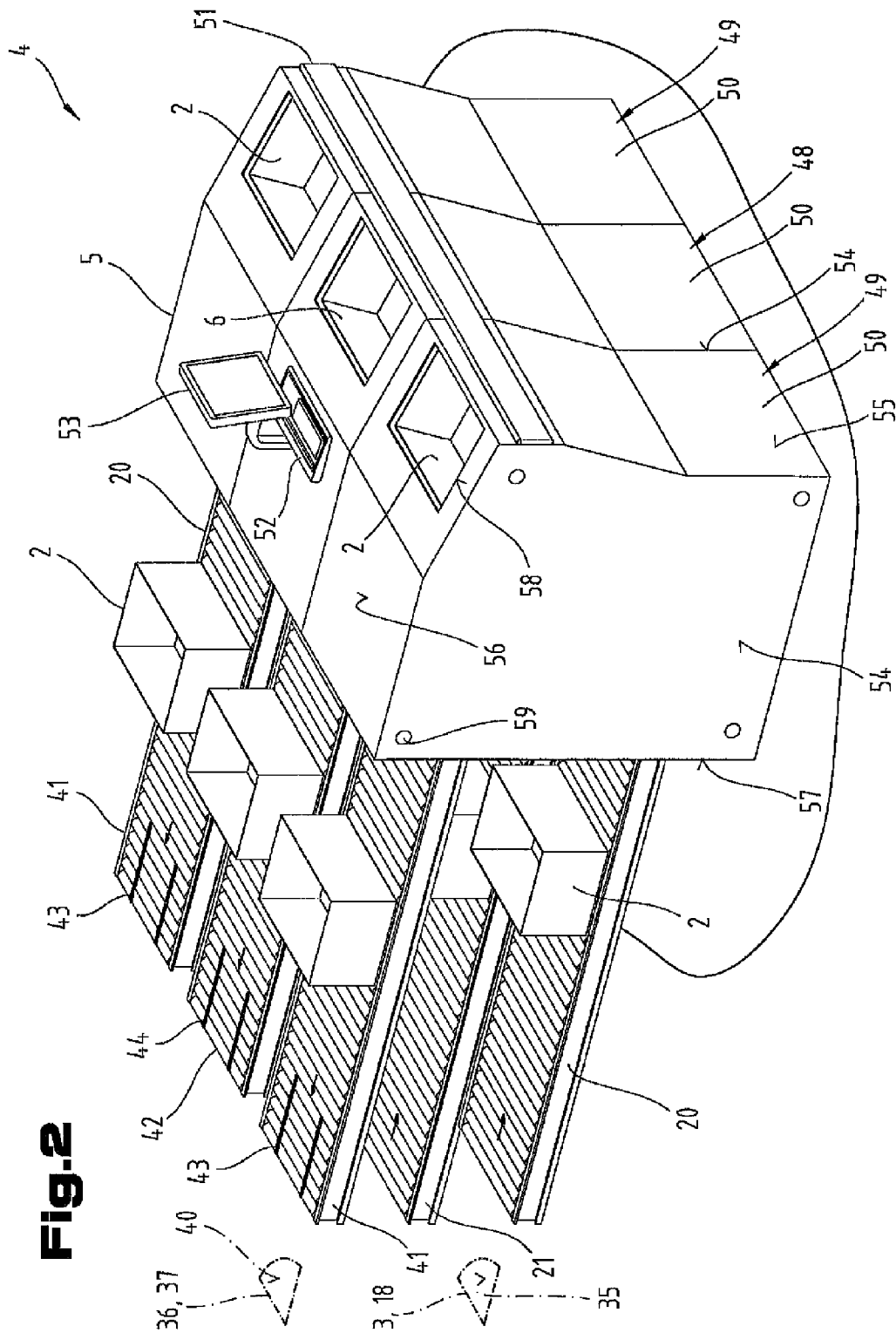
FIG. 2 is a perspective view illustrating an order picking workstation with an order picking system.

FIG. 2 illustrates an example of an embodiment of an order picking system 5, comprising an order picking station 48 for destination containers 6 and order picking stations 49 for source containers 6 disposed on either side of it.

The order picking stations 48, 49 each comprise a frame 50 and a support bar 51 on a front face, on which the order picker 7 can be supported during a picking operation. The order picking system 5 comprises at least one input unit 52 and at least one output unit 53. The input unit 52 is a keyboard or confirm key, for example, by means of which the end of a picking operation can be confirmed. The output unit 53 comprises a visual and/or acoustic display, for example a monitor, by means of which the number of articles to be taken out of the source containers 2 can be displayed.

As indicated in FIG. 2, the frame 50 comprises side walls 54 (first frame wall parts), a front wall 55 (second frame wall part) and a top wall 56 (third frame wall part). The side walls 54 (first frame wall parts), front wall 55 (second frame wall part) and top wall 56 (third frame wall part) form a surround (housing) for container-transport apparatuses and container-supply apparatus that will be described in more detail below. The side walls 54 are disposed on both sides of the conveyor systems 20, 21, 41, 42 and extend parallel with one another. The front wall 55 connects the side walls 54 on a front face of the surround lying opposite the conveyor systems 20, 21, 41, 42. The conveyor systems 20, 21, 41, 42 disposed on conveyor levels 35, 40 lying one above the other extend on a rear face of the surround between the side walls 54 through an opening 57. The top wall 56 extends above the second conveyor systems 41, 42 and connects the side walls 54 to a top face of the surround.

The top wall 56 is provided with a window-like cut-out 58 through which the order picker 7 has access to a source container 2 or destination container 6 in order to take articles out of the source container 2 or place articles in the destination container 6.

The order picking station 48, 49 is an autarkical module unit which can be combined in any arrangement with another order picking station 48, 49 to form the order picking system 5. For example, an order picking station 48 for source containers 2 might simply be combined with an order picking station 49 for destination containers 6. Alternatively, the order picking station 49 for source containers 2 may be disposed between order picking stations 48 for destination containers 6. However, it would also be possible for exclusively one or more order picking station(s) 49 for source containers 2 to be provided at the order picking workstation 4; 9, and, next to the order picking station 49, one or more buffer areas is or are provided, at which a loading aid, such as a pallet, may be held in readiness.

The order picking stations 48, 49 may each have mechanical, mutually engageable coupling elements 59 on the frame 50, in particular on mutually facing side walls 54.

Each of the order picking stations 48, 49 can be controlled independently of the others so that the conveying movements of the source and destination containers 2, 6 are uncoupled from one another. If one order picking station 48 and two order picking stations 49 are provided, as illustrated in FIG. 2, source containers 2 and destination containers 6 for different picking orders can be made available simultaneously. For example, at least one article from the first source container 2 brought into the left-hand order picking station 49 might be being placed in the destination container 6 for a first picking order at the same time as a second source container 2 for a second picking order is being brought into the right-hand order picking station 49. This results in a high picking efficiency.

Figure 3:
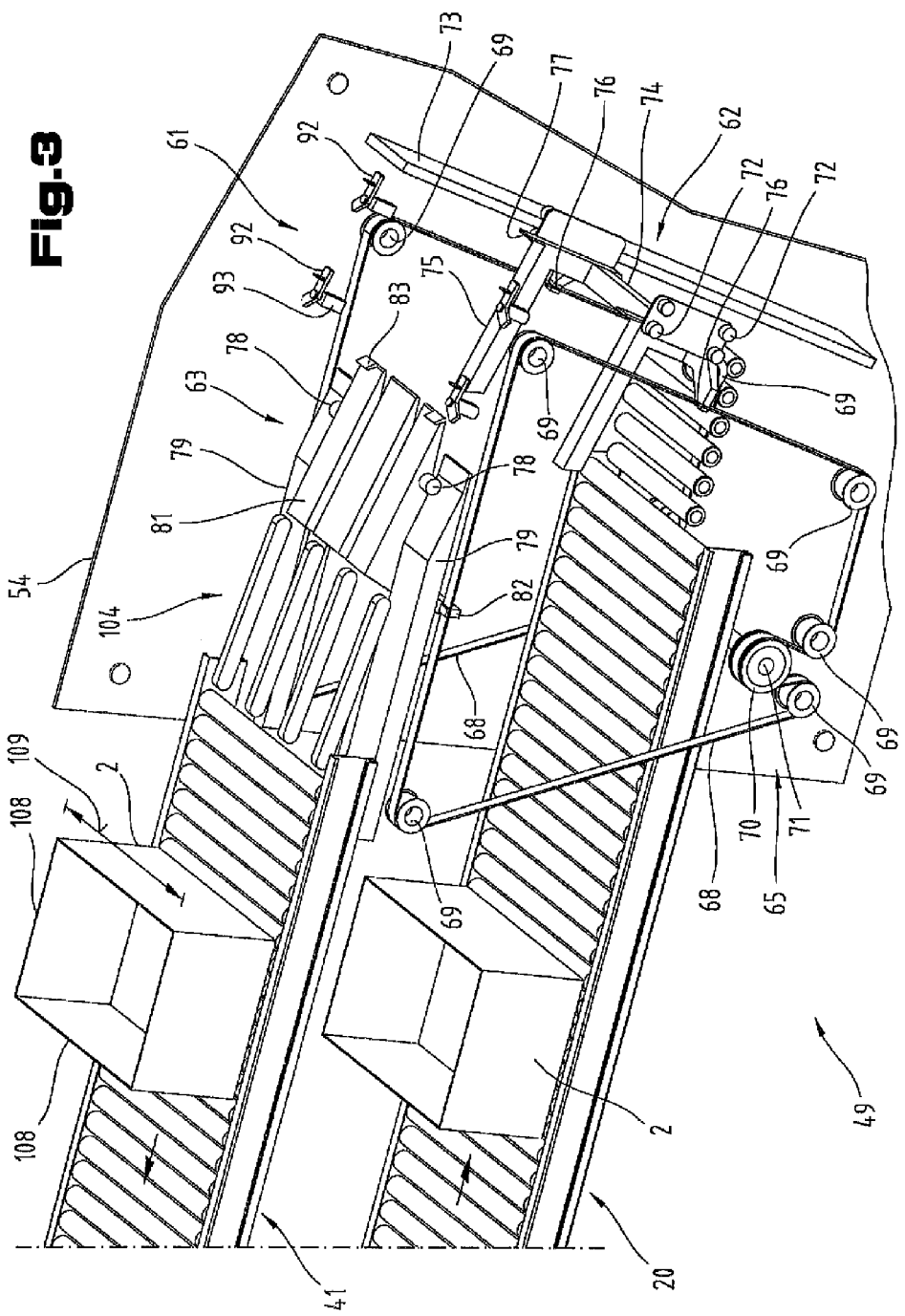
FIG. 3 is a perspective view illustrating an order picking station for the order picking system illustrated in FIG. 2.

FIG. 3, for example, illustrates an order picking station 48 for source containers 2 with a left-hand side wall 54 which is not shown in order to provide a clearer view, a front wall 55 and a top wall 56. The description of the order picking station 48 for source containers 2 (source loading aids) given below also applies in the same way to the order picking station 49 for destination containers 6 (destination loading aids) and the order picking station 49 adjoins the first conveyor system 21 and second conveyor system 42.

The order picking station 48 for picking articles from source containers 2 (loading aids) by an order picker 7 comprises the frame 50 and housing with side walls 54, the front wall 55 and/or the top wall 56, an automated source container supply apparatus 61, an automated first source container transport apparatus for transporting source containers 2 to the source container supply apparatus 61 and an automated second source container transport apparatus for transporting source containers 2 away from the source container supply apparatus 61.

The first source container transport apparatus is provided in the form of a first carrying unit 62 for at least one source container 2 and the second source container transport apparatus is provided in the form of a second carrying unit 63 for at least one source container 2. The second carrying unit 63 comprises an essentially horizontal carrying platform 81 or carrying table which can be displaced between a pick-up and transfer position 100 at the supply apparatus 61 and a transfer and pick-up position 101 at the conveyor system 41, 42. The source container 2 is conveyed by means of the transport apparatuses and carrying units 62, 63 along a transport path 64 between the first conveyor system 20 and second conveyor system 41, as indicated by broken lines in FIG. 4.

Both the first carrying unit 62 and the second carrying unit 63 are coupled with a common, reversible positioning drive 65. In the embodiment illustrated, the positioning drive 65 comprises a drive station 66 with a single, reversible drive motor 67 (FIG. 4), in particular a reversible electric motor, and synchronously drivable traction drives 68 disposed on either side of the transport path 64. Alternatively, it would also be possible for a drive motor 67 (not illustrated) to be provided for each traction drive 68, in which case the drive motors 67 are electrically synchronized. The drive motor 67 may also be provided in the form of a hydraulic drive, linear drive or such like. It would naturally also be possible to use only a single traction drive 68, to which both the first carrying unit 62 and the second carrying unit 63 are connected.

Each traction drive 68 comprises an endlessly circulating traction means, which is guided around pulley wheels 69 and a driving wheel 70. The driving wheels 70 of the traction drives 68 are coupled with the common drive motor 67 via a drive shaft 71. However, each driving wheel 70 could just as easily be coupled with a drive motor 67. The pulley and driving wheels 69, 70 are mounted on the frame 50 or on the side walls 54. The traction means are provided in the form of a toothed belt, a chain or similar.

The first carrying unit 62 for a source container 2 is supported on guide elements 72 mounted on it, preferably on stationary guide arrangements 73. In the embodiment illustrated, the guide arrangements 73 are disposed on both sides of the first carrying unit 62 and extend parallel with one another between the first conveyor system 20 and the supply apparatus 61 across a longitudinal portion of the transport path 64. The guide arrangements 79 are preferably secured to the frame 50 or to the side walls 54.

The first carrying unit 62 comprises a guide frame 74 and a carrying platform 75 for a source container 2 extending out from it, and the guide frame 74 is connected to one or both fraction drives 68 via a fixing means 76, for example clamp connectors and such like, in a first longitudinal portion of the traction drives(s) 68 or traction means. The guide frame 74 may be provided with the guide elements 72, which are supported on the stationary guide arrangement(s) 73. As illustrated, the carrying platform 75 comprises parallel carrying forks extending at a distance apart from one another and projecting out from the guide frame 74. The carrying platform 75 forms a carrying surface for at least one source container 2 and is provided with retaining elements 77 extending out from the carrying surface, against which a source container 2 loaded on the carrying platform 75 can be supported. The carrying surface is inclined relative to a horizontal plane and is so preferably downwards in the direction towards the order picker 7 at an angle of up to 45°, for example 15°.

The second carrying unit 63 for a source container 2 is supported on guide elements 78, mounted on it, preferably on stationary guide arrangements 79.

The second carrying unit 63 comprises a guide frame 80 (FIG. 5) and, connected to it, a carrying platform 81 for a source container 2, and the guide frame 80 is connected to one or both traction drives 68 via fixing means 82, for example clamp connectors and such like, in a second longitudinal portion of the traction drives(s) 68 or fraction means. The guide frame 80 may be provided with the guide elements 78, which are supported on the stationary guide arrangement(s) 79. The carrying platform 81 forms a carrying surface for at least one source container 2 and is provided with retaining elements 83 extending out from it, against which a source container loaded on the carrying platform 81can be supported. The carrying surface is inclined relative to a horizontal plane and is so preferably downwards in the direction towards the order picker 7 at an angle of up to 45°, for example 15°.

In the embodiment illustrated, the guide arrangements 79 are disposed on both sides of the second carrying unit 63 and extend parallel with one another between the second conveyor system 41 and supply apparatus 61 across a longitudinal portion of the transport path 64. The guide arrangements 79 are preferably secured to the frame 50 or to the side walls 54.

Alternatively, it would also be possible, although this is not illustrated, for exclusively one guide arrangement 79 to be provided between the traction drives 68, which is disposed underneath the second carrying unit 63 and extends between the second conveyor system 41 and supply apparatus 61 across a longitudinal portion of the transport path 64. In this case, only one guide element 78 may be provided, which can be supported on the guide arrangement 79.

As illustrated in the drawings, it is of advantage if the guide arrangement(s) 79 forms or form a running plane 84 or ramp(s) in one guide portion, rising in the direction of the second conveyor system 41. The gradient of the ramp 84 is between 5° and 30°. The guide portion may be adjoined by an upstream guide portion in the direction of movements 85 of the second carrying unit 63 and a downstream guide portion, each of which forms an essentially horizontal guide plane 86, 87.

Based on a preferred embodiment, the carrying platform 81 is connected to the guide frame 80 so as to be pivotable about a bearing axis 88 or is pivotable about a bearing axis 88 relative to the guide arrangement(s) 79 and has guide elements 78 constituting axes of rotation extending parallel with the bearing axis 88, in particular supporting wheels.

Based on this embodiment, the carrying platform 81 may be guided by the guide arrangement(s) 79 and the guide element(s) 78 in such a way during the positioning movement along the transport path 64 between the supply apparatus 61 and the second conveyor system 41 that a support angle of the carrying surface 89 relative to a second conveyor level 90 of the second conveyor system 41 may vary.

Figure 5:
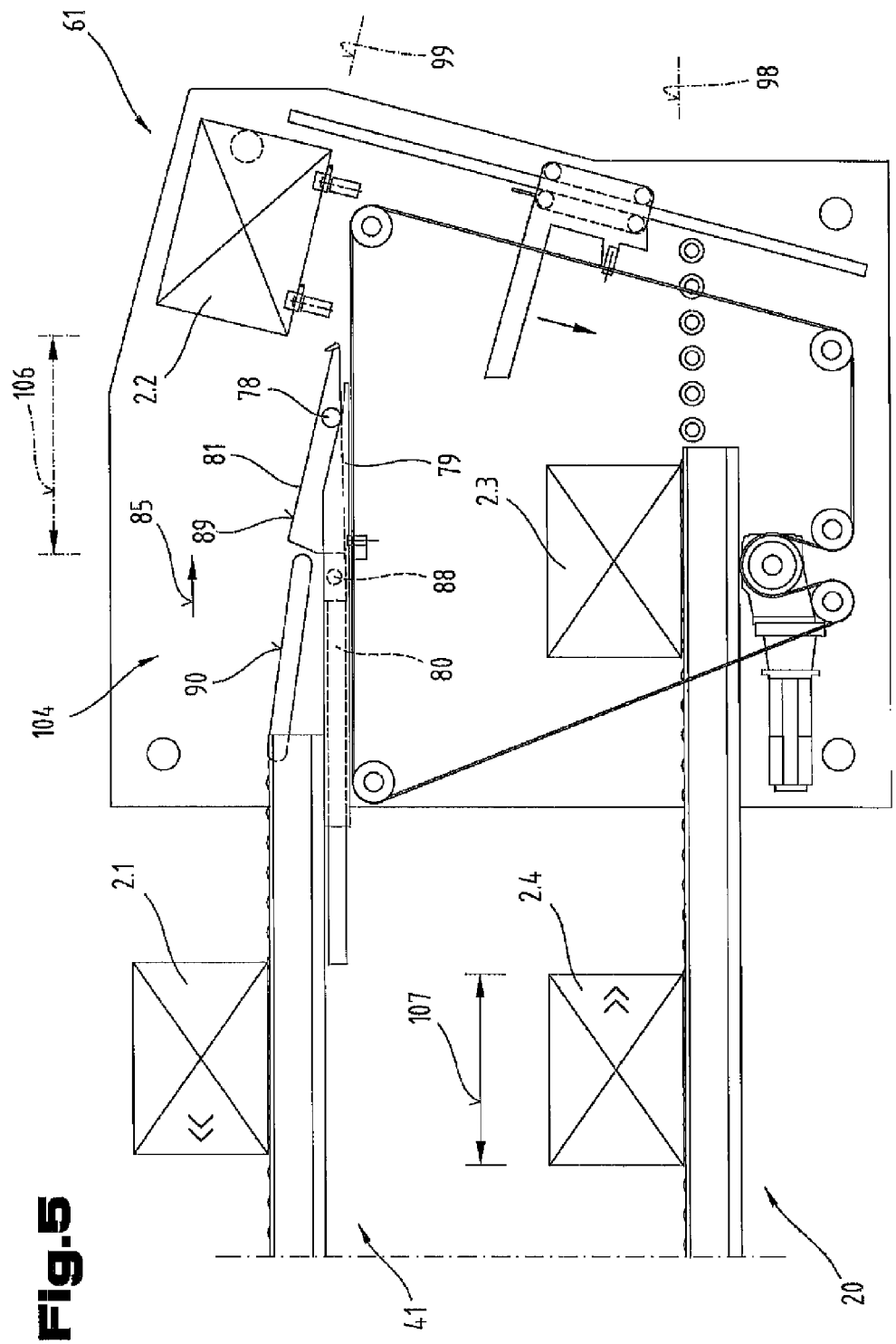

When the carrying platform 81 is disposed by means of the guide element(s) 78 in the guide portion of the guide arrangement(s) 79 which forms an inclined running plane 84, the carrying surface 89 and conveyor level 90 extend essentially plane parallel, as maybe seen in FIG. 5. Accordingly, the carrying surface 89 and conveyor level 90 subtend an angle of essentially 180°.

Figure 4:
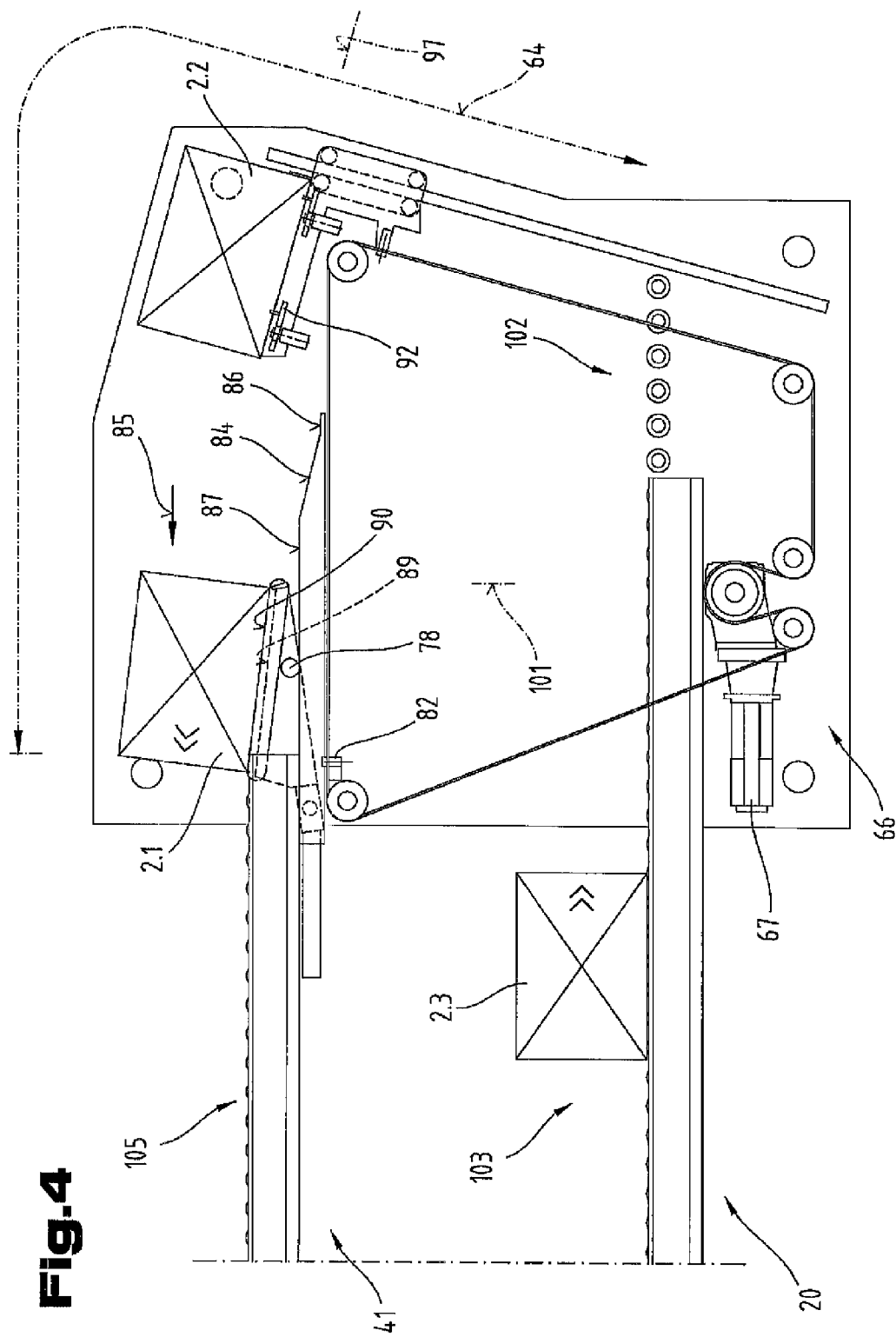

However, when the carrying platform 81 is disposed by means of the guide element(s) 78 in the guide portion of guide arrangement(s) 79 which forms an essentially horizontal guide plane 87, the carrying surface 89 and conveyor level 90 subtend an angle of less than 180°, as may be seen in FIG. 4.

In other words, the source container 2 on its conveying movement between the supply apparatus 61 and second conveyor system 41 in the direction of movement 85 is tilted into a transfer position, as illustrated in FIG. 8, even before being transferred from the second carrying unit 63 onto the second conveyor system 41, in which a support surface 91 of the source container 2 extends essentially parallel with the conveyor level 90.

During the transfer movement of the carrying platform 81 by the guide element(s) between the conveyor portion incorporating an inclined running plane 84 and the conveyor portion incorporating a horizontal guide plane 87, the source container 2 is tilted out of the transfer position into a pick-up position tilted slightly backwards in which a front edge of the source container 2 (loading aid) facing the second conveyor system 41 is initially in contact with the conveyor level 90. Due to the ongoing positioning movement of the carrying platform 81 in the direction of the second conveyor system 41, the support surface 91 of the source container 2 is moved so that it lies on the conveyor level 90.

As a result, even at a very high displacement speed of the second carrying unit 63 or conveying speeds of the source container 2, the transfer of a source container 2 between the second carrying unit 63 and the second conveyor system 41 is quiet.

Figure 6:
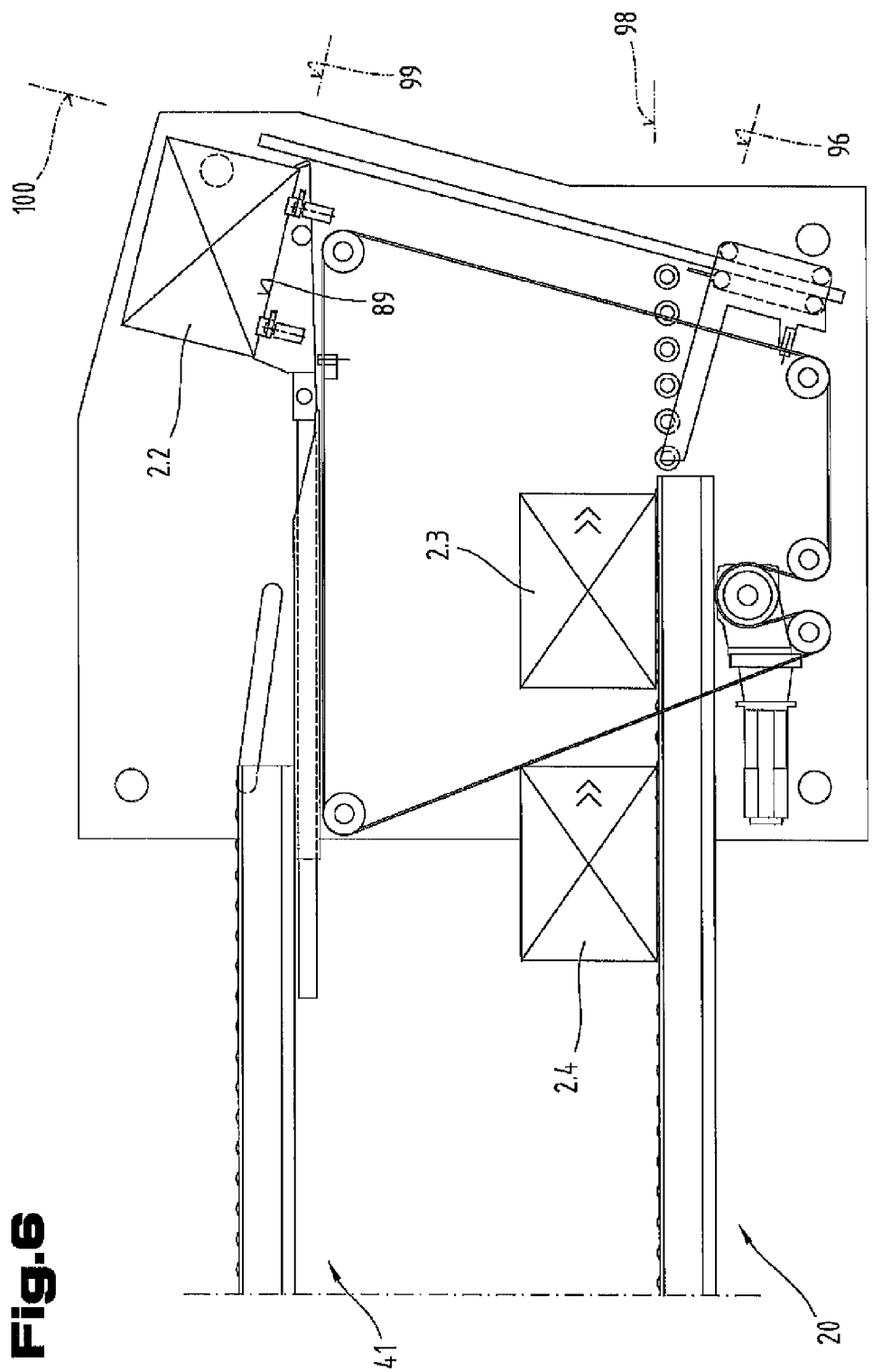

FIG. 3 illustrates the stationary supply apparatus 61 for a source container 2, which is preferably of a structurally separate design from the carrying units 62, 63. It is disposed along the transport path 64 between the first conveyor system 20 and second conveyor system 41 and comprises at least one parking element 92 for a source container 2 on either side of the transport path 64. The parking elements 92 can be displaced by actuator drives 93 between an initial position (FIGS. 3, 4, 7, 8) and a pick-up position (FIGS. 5, 6). The parking elements 92 and actuator drives 93 are mounted on the frame 50, in particular on the side walls 54*t*.

In the embodiment illustrated, two left-hand parking elements 92 and two right-hand parking elements 92 are provided respectively on either side of the transport path 64. Each parking element 92 is coupled with an actuator drive 93. However, it would also be possible for the left-hand parking elements 92 to be coupled with a single actuator drive 93 and the right-hand parking elements 92 to be coupled with a single actuator drive 93. Alternatively, the left-hand and right-hand parking elements 92 could be coupled with only a single actuator drive 93. The mechanical coupling between the pivot shafts of the parking elements 92 may be established by means of a traction means, for example toothed belts and such like, or linkage rods. The actuator drive(s) 93 are provided in the form of reversible, electric or hydraulic pivot drives, for example.

The drive station 66, in particular the drive motor(s) 67 and the actuator drive(s) 92 are connected to a control unit (not illustrated), which in turn controls the motion sequences of the carrying units 62, 63 and parking elements 62 in such a way that a collision is avoided between a first source container 2 as it is being moved by the first conveyor system 20 in the direction towards the supply apparatus 61 and a second source container 2 as it is being moved by the supply apparatus 61 in the direction towards the second conveyor system 20, as illustrated in FIG. 8.

When the parking elements 92 (FIGS. 3, 4, 7, 8) are in the initial position, a source container 2 can be moved past the parking elements 92, whereas when they are in the pick-up position (FIGS. 5, 6) a source container 2 can be deposited on the parking elements 92. A source container 2 In the pick-up position is disposed in a picking position and hence in a position which enables an order picker 7 to remove articles. A destination container 6 in the pick-up position is in a picking position and hence in a position suitable for the order picker 7 to assume a loading position in which the articles removed from the source container 2 can be placed in the destination container 6.

The parking elements 92 respectively comprise a parking tongue 94 and a positioning element 95 extending out vertically from it, as illustrated in FIG. 8. When the source container 2 or order container 6 is in the picking position, it is centered between the positioning elements 95 of the parking elements 92 moved respectively into the pick-up position and sits on the parking tongues 94.

The parking elements 92 are angled levers for example, each of which can be pivoted backwards and forwards about a pivot axis by a positioning angle of preferably 90°, each and forming the parking tongue 94 in a lever portion adjacent to the transport path 64.

As may be seen from FIGS. 4 to 8, the first carrying unit 62 for a first source container 2 and the second carrying unit 63 for a second source container 2 are coupled in displacement by means of the single positioning drive 65 and together simultaneously effect a displacing movement in the same direction, either in a first direction of movement 85 in the clockwise direction (FIG. 5) or in a second direction of movement 85 in the counter-clockwise direction (FIG. 7).

Accordingly, the first carrying unit 62 can be displaced by the positioning drive 65 between a pick-up position 96 (FIGS. 6, 7) at the first conveyor system 20 and a transfer position 97 (FIG. 4) at the supply apparatus 61. The pick-up position 96 lies on a first height level underneath a first conveyor level 98 of the first conveyor system 20. The transfer position 97 lies on a second height level just above a picking position 99 (FIG. 5) or picking level for a source container 2 to permit an unobstructed displacement of the parking element 92. The transfer position 97 lies above the pick-up position 96. The transfer position 97 and picking position 99 may optionally coincide in terms of height level. The picking level is preferably downwardly inclined relative to a horizontal plane in the direction towards the order picker 7 at an angle of up to 45°, for example 15°, thereby resulting in a particularly ergonomic order picking arrangement for the order picker 7.

Accordingly, the second carrying unit 63 can be displaced by the positioning drive 65 between a pick-up position 100 (FIG. 6) at the supply apparatus 61 and a transfer position 101 (FIG. 4) at the second conveyor system 41. The pick-up position 100 and transfer position 101 lie essentially on the same height level above the first conveyor system 20. In the pickup position 100, the carrying surface 89 on the second carrying unit 63 is above the picking position 99 or picking level for a source container 2. In the pick-up position 100, the carrying surface 89 and picking level may optionally coincide in terms of height level. In the transfer position 101, the carrying surface 89 at the second conveyor system 41 is underneath the second conveyor level 90, as may be seen in FIG. 4. As a result, when a source container 2 is transferred onto the second conveyor system 41, it can be moved at a very high conveying speed irrespective of the displacing movement of the second carrying unit 63. The fact that the conveying movement of a source container 2 is uncoupled from the displacing movement of the second carrying unit 63 means that another movement into the pick-up position 100 is possible.

The fact that the first carrying unit 62 effects exclusively a vertical movement and the second carrying unit 63 effects exclusively a horizontal movement enables a particularly rapid switch between the first conveyor system 20 and second conveyor system 41. It is due to the supply apparatus 61 that the displacing movements can be uncoupled.

As may be seen from the drawings, the first conveyor system 20, 21 comprises a transfer device 102 in a first conveyor portion facing the supply apparatus 61 and a conveyor device 103 in a second conveyor portion facing away from the supply apparatus 61. The driven conveyor device 103 comprises conveyor elements and serves as a buffering conveyor, in particular a horizontal buffering conveyor with buffering places for a plurality of source containers 2 and destination containers 6. To this end, the conveyor device enables an accumulation function. The transfer device 102 forms a holding place for a source container 2 or order container 6 and comprises at least one preferably driven conveyor element. In the embodiment illustrated, the conveyor elements of both the transfer device 102 and conveyor device 103 are provided in the form of a roller conveyor. As illustrated in FIG. 3, a width of the conveyor element of the transfer device 102 is selected so that the carrying forks of the carrying platform 75 can be moved past on oppositely lying longitudinal sides of the transfer device 102. The transfer device 102 and conveyor device 103 constitute the horizontal first conveyor level 98. The first conveyor level 35 of the distribution systems 3; 8 and the first conveyor level 98 preferably lie in a horizontal plane.

As may be seen from the drawings, the second conveyor system 41, 42 comprises a transfer device 104 in a first conveyor portion facing the supply apparatus 61 and a conveyor device 105 in a second conveyor portion facing away from the supply apparatus 61. The driven conveyor device 105 comprises conveyor elements and may serve as a buffering conveyor, in particular a horizontal buffering conveyor with buffering places for a plurality of source containers 2 and destination containers 6. To this end, the conveyor device may enable an accumulation function. The transfer device 104 forms a holding place for a source container 2 or order container 6 and comprises at least one driven conveyor element. In the embodiment illustrated, the conveyor elements of the conveyor device 105 are provided in the form of a roller conveyor. The conveyor elements of the transfer device 104 are provided in the form of parallel conveyor belts extending in the direction of the conveying movement of the source containers 2 and destination containers 6.

The transfer device 104 extends along the transport path 64 in the direction of the supply apparatus 61 and constitutes conveyor level 90 extending downwards at an angle in the direction of the supply apparatus 61. The conveyor level 90 preferably subtends an angle of up to 30° with a horizontal plane. A short displacing movement of the second carrying unit 63 and hence short container changeover times can be achieved if the longitudinal distance 106 indicated in FIG. 5 between mutually facing boundary edges along the transfer device 104 and supply apparatus 61 are approximately the same as the lengthways dimension 107 of a source container 2 or destination container 6. The conveyor device 105 constitutes a horizontal conveyor level which lies in a same horizontal plane as the second conveyor level 40 of the distribution system 36.

As illustrated in FIGS. 4 to 8, the source container 2 and destination container 6 are preferably moved on the first conveyor level 35, 98 from the bottom via the first carrying unit 62 up to the height level of the supply apparatus 61 above the first conveyor system 20, 21 and once the picking operation is complete are picked up from the supply apparatus 61 by the second carrying unit 62 and conveyed by it to the second conveyor system 41, 42. This preferred conveying arrangement enables a conveying movement of the source container 2 or destination container 6 essentially perpendicular to the top wall portions of the top wall 56 bounding the cut-out 58 so that the side walls 108 extending out from the base of a source container 2 or destination container 6 (loading aids) can be moved by their terminal edges from underneath in the direction towards the top wall portions (FIG. 3). The cut-out 58 may be designed so that a first lengthways dimension (width) and second lengthways dimension (length) are slightly shorter than a first lengthways dimension 107 (width) and second lengthways dimension 109 (length) so that the side walls 108 surround the cut-out 58. Alternatively, the cut-out 58 may have a first lengthways dimension (width) and second lengthways dimension (length) which are slightly longer than a first lengthways dimension 107 (width) and second lengthways dimension 109 (length), in which case the side walls 108 extend into the cut-out 58.

However, another option would be for the conveyor arrangement to have the reverse layout. In this case, the source container 2 and destination container 6 are conveyed from the top on the second conveyor level 40, 90, picked up from the second conveyor system 41, 42 by the second carrying unit 63 and conveyed to the supply apparatus 61. When a picking operation is complete, the source container 2 or destination container 6 is picked up by the first carrying unit 62 moved on the height level of the supply apparatus 61 and conveyed onto the first conveyor system 20, 21. Accordingly, the source container 2 and destination container 6 are conveyed on the third distribution system 36 to the order picking systems 5 and on the first distribution system 3 and optionally second distribution system 8 away from the order picking systems 5 again. As a result of this feature, an order picker 7 can see the contents of the source container 2 even at a greater distance from the order picking station 48, 49 and thus prepare for the picking operation very quickly.

A description will be given below of the method for picking articles from source containers 2 for destination containers 6 with reference to FIGS. 1, 2, 4 to 8.

When a picking order is electronically detected at a computer system, at least one source container 2 for this picking order is retrieved from the high-bay racking 1 by the automated conveyor system 12, 16 and transferred to the first distribution system 3 and optionally from it to the second distribution system 8. The source container 2 is conveyed on the distribution system 3, 8 to one of the order picking workstations 4; 9 and is moved from the distribution system 3, 8 by means of one of the outfeed diverter devices 29 to the first conveyor system 20. To this end, the outfeed diverter devices 29 and distribution systems 3, 8 are connected to the control unit, which in turn co-ordinates the allocation to the order picking systems 5.

Similarly, at least one destination container 6 for this picking order is conveyed to the order picking system 5 to which the source container 2 was dispatched. This may be an empty destination container 6 conveyed by the storage supply conveyor 22 via the first distribution system 3 and optionally the second distribution system 8 to one of the order picking workstations 4; 9 and then conveyed out by the distribution system 3, 8 by means of one of the outfeed diverter devices 30 to the first conveyor system 21. Alternatively, the destination container 6 may already contain articles. This is the case if the destination container 6 could only be "partly picked" at a first order picking system 5. This being the case, the "partly picked" destination container 6 is conveyed from its picking position 99 at the supply apparatus 61 via the second carrying unit 63 to the second conveyor system 42 and by it fed out to the third distribution system 36 by means of the infeed diverter device 44. Having arrived there, the "partly picked" destination container 6 is conveyed away from the third distribution system 36 and fed onto the storage return conveyor 23 by means of the outfeed diverter device 45. The "partly picked" destination container 6 is then fed by means of the infeed diverter device 27 onto the distribution system 3 and conveyed by the first distribution system 3 and optionally the second distribution system 8 to one of the order picking workstations 4; 9 and then fed from the distribution system 3, 8 by means of one of the outfeed diverter devices 30 to the first conveyor system 21 of a second order picking system 5. At the second order picking system 5, the articles still needed for this picking order, which are now sitting in readiness having been brought in by means of a source container 2, are placed in the "partly picked" destination container 6. The destination container 6 may now contain all the different articles needed for this picking order or it may have to be conveyed to a different order picking system 5 for another picking operation.

If the destination container 6 can be filled with all the articles needed for this picking order at a single order picking system 5, the "fully picked" destination container 6 is fed from the second conveyor system 42 by means of the infeed diverter device 44 to the third distribution system 36 and conveyed by it to the conveyor 46, where it is fed by means of the outfeed diverter device 47 onto the conveyor 46.

The source container 2 is conveyed from the high-bay racking 1 to the selected order picking workstation 4; 9 based on a timing such that the destination container 6 and source container 2 arrive at the order picking workstation 4; 9 more or less simultaneously.

For the picking operation, the order picker 7 is presented with a display on the output unit 53 (FIG. 2) indicating the quantity to be picked and on this basis places the corresponding quantity of articles in the destination container 6. The order picker 7 confirms the end of the picking operation at the input unit 52 (FIG. 2).

The conveying movement of the source containers 2 will now be described more specifically with reference to FIGS. 4 to 8. As described above, the conveying movement may also be reversed but a preferred conveying movement of the source containers 2 from the bottom to the top is described below. The same applies to the order container 6.

As illustrated in FIG. 4, the second carrying unit 63 is in the transfer position 101 in which a first source container 2.1 has already been transferred onto the second conveyor system 20. The first carrying unit 62 is in the transfer position 97 in which a second source container 2.2 is being transferred to the parking elements 92 which still have to be moved into the pick-up position (FIGS. 5, 6). A third source container 2.3 is already being conveyed on the first conveyor system 20 back to the order picking station 5.

When the first carrying unit 62 and second carrying unit 63 have been moved by the common positioning drive 65 out of their transfer positions 97, 101 in the direction of movement 85 towards their pick-up positions 96, 100, as illustrated in FIG. 5, the second source container 2.2 is deposited on the parking elements 92 which have already been moved into the pick-up position. As this happens, the first source container 2.1 is conveyed away on the second conveyor system 41, the third source container 2.3 is placed in readiness at the front end of the first conveyor system 20 and a fourth source container 2.4 is conveyed on the first conveyor system 20 to the order picking station 5. Having been deposited on the parking elements 92, the second source container 2.2 is disposed in its picking position 99 on the supply apparatus 61, in which articles for a picking order are taken out of the source container 2.2 and placed in a destination container 6 positioned in readiness at the order picking station 48. Another option is for the articles disposed in a loading aid, for example on a pallet, to be positioned in readiness at a buffer place provided adjacent to the order picking station 49.

In FIG. 6, the first carrying unit 62 is in the pick-up position 96 in which the third source container 2.3 can be transferred from the first conveyor system 20 onto the first carrying unit 62. The second carrying unit 63 is in the pick-up position 100 in which the second source container 2.2 is being lifted by the parking elements 92 still to be moved into the pick-up position. As this is taking place, the fourth source container 2.4 is being conveyed in the direction towards the front end of the first conveyor system 20.

As illustrated in FIGS. 7 and 8, the parking elements 92 have been moved into the initial position so that the second source container 2 and third source container 2 can be moved along between the parking elements 92. Consequently, the first carrying unit 62 can be moved back out of the pick-up position 96 into the transfer position 97 in which the third source container 2.3 is transferred onto the parking elements 92 still to be moved into the pick-up position. As this takes place, the second source container 2.2 is conveyed away by means of the second carrying unit 63 to the second conveyor system 41. The fourth source container 2.4 is positioned in readiness at the front end of the first conveyor system 20 and a fifth source container 2.5 is being conveyed in the direction towards the front end of the first conveyor system 20.

Accordingly, as may be seen, the carrying units 62, 63 are moved by the positioning drive 65 along the transport path 64 in a shuttling motion between the pick-up position 96 for a source container 2 or destination container 6 disposed on the first conveyor system 20, 21 and a transfer position 101 for a source container 2 or destination container 6 disposed on the second conveyor system 41, 42 as well as in a shuttling motion between this pick-up and transfer position 96, 101 and a transfer- and pick-up position 97, 100 and a transfer- and pick-up position 97, 100 disposed at the supply apparatus 61. If the conveying movement of the source containers 2 and destination containers 6 is reversed from the top to the bottom, the pick-up position 96 defines a transfer position 96 and the transfer position 101 defines a pick-up position 101. Similarly, the transfer position 97 defines a pick-up position 97 and the pick-up position 100 defines a transfer position 100.

The expression "shuttling motion" in this context means that in a first displacement cycle during which a first loading aid 2, 6 is transported away from the supply apparatus 61 on the one hand and a second loading aid 2, 6 is transported to the supply apparatus 61 on the other hand, the (loaded) carrying units 62, 63, coupled in displacement, are moved in a first direction of movement 85 (FIGS. 7, 8) into the transfer and pick-up positions 97, 101.

If the conveying movement of the loading aids 2, 6 is effected from the bottom to the top, once the first loading aid 2, 6 has been transferred from the carrying unit 63 onto the conveyor system 41, 42 on the one hand and the second loading aid 2, 6 has been transferred from the carrying unit 62 onto the supply apparatus 61 on the other hand, the (unloaded) carrying units 62, 63, coupled in displacement, are moved opposite the first direction of movement 85 (FIG. 5) back into the pick-up positions 96, 100 at the conveyor system 20, 21 and supply apparatus 61 during a subsequent displacement cycle.

If the conveying movement of the loading aids 2, 6 is effected from the top to the bottom, once the first loading aid 2, 6 has been transferred from the carrying unit 63 onto the supply apparatus 61 on the one hand and the second loading aid 2, 6 has been transferred from the carrying unit 62 onto the conveyor system 20, 21 on the other hand, the (unloaded) carrying units 62, 63, coupled in displacement, are moved opposite the first direction of movement 85 back into the pick-up positions 97, 101 at the conveyor system 41, 42 and supply apparatus 61 during a subsequent second displacement cycle.

The movements of the carrying units 62, 63 between the transfer and pick-up positions 97, 100; 96, 101 at the supply apparatus 61 and conveyor system 20, 21, 41, 42 are very short. As a result, the loading aids 2, 6 can be very rapidly switched between the conveyor systems 20, 21, 41, 42, and it is with a view to uncoupling the displacing movement of the carrying units 62, 63 and the picking operation that the supply apparatus 61 is provided. Accordingly, the pick-up position 96 and transfer position 101 at the conveyor systems 20, 21, 41, 42 define a first turnaround position (end position) and second turnaround position (end position) for the displacing movement of the carrying units 62, 63. The at least one drive motor 67 for the positioning drive, which is typically provided in the form of an electronically reversible electric motor, is controlled accordingly by the control unit.

The embodiments illustrated as examples represent possible variants of the order picking system, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the order picking station, order picking system and storage system, they and their constituent parts are illustrated to a certain extent out of scale and/or on an enlarged scale and/or on a reduced scale.

| List of reference numbers | |
|---|---|
| 1 | High-bay racking |
| 2 | Source container (storage container) |
| 3 | First distribution system |
| 4 | Order picking workstation |
| 5 | Order picking system |
| 6 | Destination container (order container) |
| 7 | Order picker |
| 8 | Second distribution system |
| 9 | Order picking workstation |
| 10 | Racking bay |
| 11 | Storage space |
| 12 | Stacker vehicle |
| 13 | Platform |
| 14 | Load-carrying device |
| 15 | Goods-in conveyor |
| 16 | Goods-out conveyor |
| 17 | Conveyor portion |
| 18 | Conveyor portion |
| 19 | Conveyor portion |
| 20 | First conveyor system |
| 21 | First conveyor system |
| 22 | Storage supply conveyor |
| 23 | Storage return conveyor |
| 24 | Assembly station |
| 25 | Infeed diverter device |
| 26 | Infeed diverter device |
| 27 | Infeed diverter device |
| 28 | Outfeed diverter device |
| 29 | Outfeed diverter device |
| 30 | Outfeed diverter device |
| 31 | Conveyor portion |
| 32 | Conveyor portion |
| 33 | Conveyor portion |
| 34 | Conveying diverters |
| 35 | Bottom conveyor level |
| 36 | Distribution system |
| 37 | Conveyor portion |
| 38 | Conveyor portion |
| 39 | Conveyor portion |
| 40 | Top conveyor level |
| 41 | Second conveyor system |
| 42 | Second conveyor system |
| 43 | Infeed diverter device |
| 44 | Infeed diverter device |
| 45 | Outfeed diverter device |
| 46 | Conveyor |
| 47 | Outfeed diverter device |
| 48 | Order picking station |
| 49 | Order picking station |
| 50 | Frame |
| 51 | Support bar |
| 52 | Input unit |
| 53 | Output unit |
| 54 | Side wall |
| 55 | Front wall |
| 56 | Top wall |
| 57 | Opening |
| 58 | Cut-out |
| 59 | Coupling element |
| 60 | |
| 61 | Container-supply apparatus |
| 62 | Carrying unit |
| 63 | Carrying unit |
| 64 | Transport path |
| 65 | Positioning drive |
| 66 | Drive station |
| 67 | Drive motor |
| 68 | Traction drive |
| 69 | Pulley wheel |
| 70 | Driving wheel |

-continued

| List of reference numbers | |
|---|---|
| 71 | Drive shaft |
| 72 | Guide element |
| 73 | Guide arrangement |
| 74 | Guide frame |
| 75 | Carrying platform |
| 76 | Fixing means |
| 77 | Retaining element |
| 78 | Guide element |
| 79 | Guide arrangement |
| 80 | Guide frame |
| 81 | Carrying platform |
| 82 | Fixing means |
| 83 | Retaining element |
| 84 | Running plane |
| 85 | Direction of movement |
| 86 | Guide plane |
| 87 | Guide plane |
| 88 | Bearing axis |
| 89 | Carrying surface |
| 90 | Conveyor level |
| 91 | Support surface |
| 92 | Parking element |
| 93 | Actuator drive |
| 94 | Parking tongue |
| 95 | Positioning element |
| 96 | Pick-up position |
| 97 | Transfer position |
| 98 | Conveyor level |
| 99 | Picking position |
| 100 | Pick-up position |
| 101 | Transfer position |
| 102 | Transfer device |
| 103 | Conveyor device |
| 104 | Transfer device |
| 105 | Conveyor device |
| 106 | Longitudinal distance |
| 107 | Lengthways dimension |
| 108 | Side wall |
| 109 | Lengthways dimension |

The invention claimed is:

1. An order picking station for picking articles from loading aids by an order picker, adjoining automated conveyor systems disposed on different height levels, loading aids being conveyed to the order picking station on a first conveyor system and loading aids being conveyed away from the order picking station on a second conveyor system, and comprising:
a loading aid supply apparatus,
an automated first loading aid transport apparatus for transporting loading aids to the loading aid supply apparatus, and
an automated second loading aid transport apparatus for transporting loading aids away from the loading aid supply apparatus,
wherein the first loading aid transport apparatus has a first carrying unit for a loading aid displaceable essentially in the vertical direction and the second loading aid transport apparatus has a second carrying unit for a loading aid displaceable essentially in the horizontal direction,
wherein the first carrying unit and second carrying unit are coupled with a common, reversible positioning drive, and
wherein the positioning drive has at least one traction drive, and both the first carrying unit and the second carrying unit are connected to and are coupled in displacement by the at least one traction drive.

2. The order picking station according to claim 1, wherein the positioning drive comprises a drive station with a reversible drive motor and the at least one traction drive.

3. The order picking station according to claim 2, wherein the drive station comprises a single reversible drive motor.

4. The order picking station according to claim 1, wherein the positioning drive comprises a drive station and synchronously drivable traction drives disposed on either side of a transport path of the loading aids along the loading aid transport apparatuses.

5. The order picking station according to claim 4, wherein the drive station comprises a single reversible drive motor.

6. The order picking station according to claim 1, wherein the first carrying unit for a loading aid is coupled with the positioning drive so that the carrying unit can be displaced between a pick-up or transfer position at the first conveyor system and a transfer or pick-up position at the supply apparatus.

7. The order picking station according to claim 1, wherein the order picking station further comprises a first guide arrangement and the first carrying unit for a loading aid comprises at least one guide element mounted thereon, wherein the first carrying unit for loading aid is supported by the at least one guide element on the first guide arrangement.

8. The order picking station according to claim 1, wherein the first carrying unit comprises:
   a guide frame incorporating guide elements, and
   a carrying platform for a loading aid projecting from the guide frame, and
   wherein the guide frame is connected to the positioning drive.

9. The order picking station according to claim 1, wherein the second carrying unit for a loading aid is coupled with the positioning drive so that the carrying unit is displaceable between a pick-up or transfer position at the supply apparatus and a transfer or pick-up position at the second conveyor system.

10. The order picking station according to claim 1, wherein the second carrying unit comprises:
    a guide frame incorporating the at least one guide element, and
    a carrying platform for a loading aid mounted thereon, wherein the guide frame is connected to the positioning drive.

11. The order picking station according to claim 10, wherein the carrying platform has a carrying surface for at least one loading aid and a retaining element extending out from the carrying surface.

12. The order picking station according to claim 1, wherein the order picking station further comprises a second guide arrangement and the second carrying unit for a loading aid comprises at least one guide element mounted thereon, wherein the second carrying unit for a loading aid is supported by the at least one guide element on the second guide arrangement.

13. The order picking station according to claim 12, wherein the second guide arrangement extends along a transport path between the loading aid supply apparatus and the second conveyor system, and the second guide arrangement has a guide portion which forms an inclined running plane for the guide element of the second carrying unit.

14. The order picking station according to claim 1, wherein the second conveyor system comprises a transfer device in a first conveyor portion and a conveyor device in a second conveyor portion, and the transfer device connects the conveyor device and second carrying unit so that a loading aid is conveyable between the second conveyor system and the second carrying unit.

15. The order picking station according to claim 1, further comprising:
    at least one actuator drive,
    wherein the loading aid supply apparatus is disposed in the transport path between the first conveyor system and second conveyor system and comprises
       at least first and second parking elements for a load on first and second sides of the transport path respectively,
    wherein the first and second parking elements are moveable by the at least one actuator drive between an initial position in which a loading aid is moveable between the first and second parking elements, and a pick-up position in which a loading aid is held ready for picking on the first and second parking elements at the loading aid supply apparatus.

16. An order picking system for picking articles from at least one source loading aid and placing in at least one destination loading aid by an order picker, comprising:
    a first order picking station for a source loading aid and
    a second order picking station for a destination loading aid,
    wherein the first and second order picking stations are as defined according to claim 1.

17. The order picking system according to claim 16, further comprising a third order picking station for a source loading aid, wherein the first, second and third order picking stations are installed adjacent to one another in a row, and the second order picking station for a destination loading aid is disposed between the first and third order picking stations for the source loading aids.

18. The order picking system according to claim 16, wherein the first and second order picking stations are connected respectively to a first circulating conveyor by a first conveyor system which conveys loading aids to the first and second order picking stations.

19. The order picking system according to claim 16, wherein the first and second order picking stations are connected respectively to a second circulating conveyor by a second conveyor system which conveys loading aids away from the first and second order picking stations.

20. A storage system comprising:
    high-bay racking,
    an automated conveyor system for storing source loading aids in the high-bay racking and retrieving source loading aids from the high-bay racking,
    an automated first distribution system for transporting the source loading aids from the high-bay racking to one of the plurality of respective order picking workstations, each having an order picking system for picking articles from at least one source loading aid and placing in at least one destination loading aid by an order picker, and
    an automated second distribution system for transporting the source loading aids away from the order picking workstations,
    wherein at least one of the order picking systems comprises:
    an order picking station for source loading aids, and
    an order picking station for destination loading aids,
    wherein the order picking stations are respectively connected to the first distribution system by a first conveyor system which conveys loading aids to the respective order picking station and to the second distribution system by a second conveyor system which conveys loading aids away from the order picking station, and
    wherein the order picking stations of the at least one order picking system are configured as defined according to claim 1.

21. The storage system according to claim 20, further comprising:
a storage return conveyor system, and
the automated second distribution system for transporting source loading aids to the storage return conveyor system and/or for transporting destination loading aids for picking orders between the order picking workstations,
wherein the order picking stations of the order picking workstations are connected by the second conveyor systems conveying source and/or destination loading aids away from the order picking stations.

22. A method comprising:
picking articles from loading aids by an order picker at an order picking station adjoining automated conveyor systems disposed on different height levels,
conveying the loading aids to the order picking station on a first conveyor system, and
conveying the loading aids away from the order picking station on a second conveyor system,
providing a loading aid supply apparatus, an automated first loading aid transport apparatus with a first carrying unit for transporting loading aids to the loading aid supply apparatus and an automated second loading aid transport apparatus with a second carrying unit for transporting loading aids away from the loading aid supply apparatus,
wherein a loading aid is conveyed by the first conveyor system via the first carrying unit to the supply apparatus and positioned in readiness for picking at the supply apparatus and is conveyed away from the supply apparatus via the second carrying unit to the second conveyor system after the picking operation,
wherein the first carrying unit and second carrying unit are moved by at least one traction drive of a common positioning drive simultaneously and together in a shuttling motion in the respective opposite directions of movement along a transport path between the conveyor systems such that a first loading aid is conveyed between one of the conveyor systems and one of the carrying units and a second loading aid is positioned in readiness at the supply apparatus by the other one of the carrying units.

23. The method according to claim 22, further comprising, moving the carrying units coupled in displacement in a first direction of movement to transfer positions or pick-up positions at the conveyor system and supply apparatus during a first movement cycle for transporting a first loading aid away from the supply apparatus and transporting a second loading aid to the supply apparatus.

24. The method according to claim 23, further comprising, after transferring the first loading aid from one carrying unit onto the conveyor system and transferring the second loading aid from the other carrying unit onto the supply apparatus, moving the carrying units coupled in displacement opposite the first direction of movement back into the pick-up positions at the conveyor system and supply apparatus during a subsequent second movement cycle.

25. The method according to claim 23, further comprising, after transferring the first loading aid from one carrying unit onto the supply apparatus and transferring the second loading aid from the other carrying unit onto the conveyor system, moving the carrying units, coupled in displacement, opposite the first direction of movement back into the pick-up positions at the conveyor system and supply apparatus during a subsequent second movement cycle.

* * * * *